United States Patent [19]

Baldwin, Jr. et al.

[11] Patent Number: 5,246,596
[45] Date of Patent: Sep. 21, 1993

[54] METHOD OF TREATING WASTE TO MAKE IT SUITABLE FOR ULTIMATE DISPOSAL

[76] Inventors: Philip N. Baldwin, Jr., 2522 Shadowbrook, Baton Rouge, La. 70816; Norman K. Murray, 603 E. 4th Ave., Covington, La. 70453

[21] Appl. No.: 940,476

[22] Filed: Sep. 4, 1992

[30] Foreign Application Priority Data

Jul. 24, 1992 [GB] United Kingdom ............... 9215723

[51] Int. Cl.$^5$ ........................... C02F 1/50; C02F 11/14
[52] U.S. Cl. ..................................... 210/750; 210/751; 210/764; 106/697
[58] Field of Search ............... 210/750, 751, 764, 766, 210/774; 106/697

[56] References Cited

U.S. PATENT DOCUMENTS

| | | | |
|---|---|---|---|
| 3,837,872 | 9/1974 | Conner | 106/74 |
| 3,841,102 | 10/1974 | Cinner et al. | 210/170 |
| 3,893,656 | 7/1975 | Opacic et al. | 210/241 |
| 4,012,320 | 3/1977 | Connr et al. | 210/751 |
| 4,471,916 | 9/1984 | Donaldson | 241/42 |
| 4,474,479 | 10/1984 | Redelman | 366/300 |
| 4,509,696 | 4/1985 | Donaldson | 241/15 |
| 4,793,927 | 12/1988 | Meehan et al. | 210/751 |
| 4,853,208 | 8/1989 | Reimers et al. | 423/659 |
| 4,902,431 | 2/1990 | Nicholson et al. | 210/751 |
| 5,013,458 | 5/1991 | Christy, Sr. et al. | 210/751 |
| 5,149,444 | 9/1992 | Hoch | 210/751 |

*Primary Examiner*—Thomas Wyse
*Attorney, Agent, or Firm*—Pravel, Hewitt, Kimball & Krieger

[57] ABSTRACT

Disclosed is a method for processing waste to render it fit for ultimate disposal. The method comprises first contacting together in a reaction mixture the waste stream, an ammonia source capable of evolving ammonia for treating the waste, $Ca(OH)_2$, pozzolanic chemicals $SiO_2$, $Fe_2O_3$, and $Al_2O_3$, and at least one pozzolanic accelerator selected from the group consisting of anionic metal silicates, anionic carbon compounds, anionic boron compounds (borate family), anionic phosphorous compounds (phosphate family), and gelling enhancers, in a manner suitable to cause pozzolanic stabilization reactions to occur thereby increasing the solids percentage of the reaction mixture. Next, the reaction mixture is allowed to reach a target temperature of at least about 90° C., to reach a pH of at least about 11.5, and to evolve ammonia gas, thereby forming a heated mixture. Finally, the exposed surface area to mass ratio of the solids in the heated mixture is increased in a manner suitable to release the evolved ammonia gas, thereby neutralizing a substantial portion of the pathogens present in the waste stream and forming a treated waste stream that is suitable for ultimate disposal.

19 Claims, 5 Drawing Sheets

---- EXPERIMENTAL
—— $Y = 10^{[a + b\log X + c(\log X)^2]}$,
$a = 1.193468$, $b = .7694975$, $c = -.2440364$,
$R^2 = .983$, S.E. $= 7.9\%$ ---- EXPERIMENTAL
—— $Y = aX^b$, $a = 45.59229$, $b = -.2688593$,
$R^2 = .958$, S.E. $= 5\%$ ---- EXPERIMENTAL
—— $Y = a + b \times \log(X)$, $a = 100.7174$, $b = 21.75474$, $R^2 = .97$ ---- EXPERIMENTAL
—— $Y = 10^{[a + b \log X + c(\log X)^2]}$, $a = 1.349998$, $b = .4066834$, $c = -8.708917E-02$, $R^2 = .987$, $S.E. = 6\%$

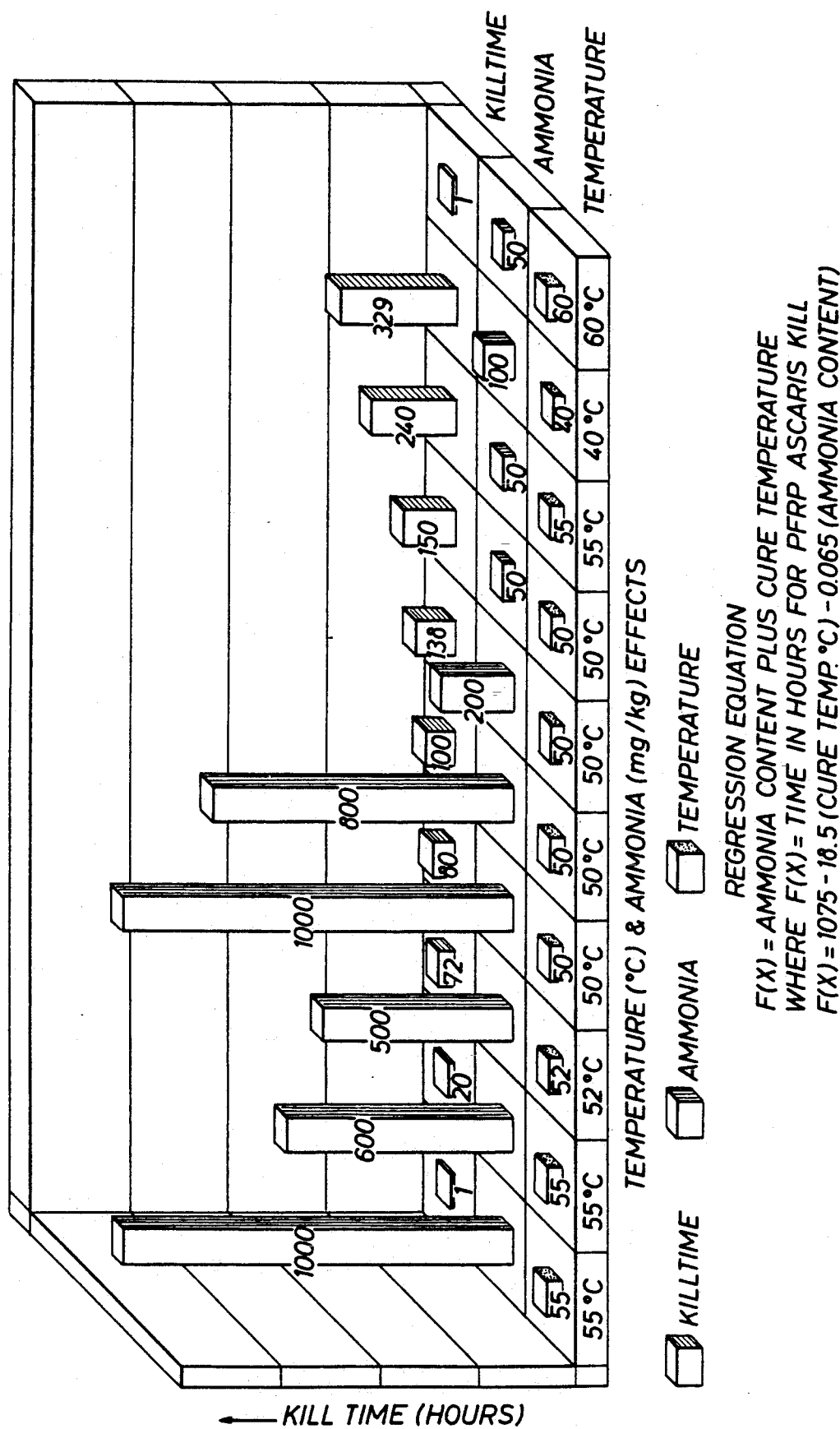

METHOD OF TREATING WASTE TO MAKE IT SUITABLE FOR ULTIMATE DISPOSAL

BACKGROUND OF THE INVENTION

1. Field of the Invention

The present invention relates to a method of treating waste. In another aspect, the present invention relates to a method of treating waste containing pathogens. In still another aspect, the present invention relates to a method of treating waste containing pathogens to render the waste suitable for ultimate disposal.

2. Description of the Related Art

One of the major problems facing society today is the processing and the disposal of waste. The term waste includes, as typical examples, garbage and related domestic wastes, raw human wastes, solid industrial wastes, packaging materials, plastics, glass and metal containers, sludges of various types and sources, slags and other materials occurring as wastes in the metallurgical or mining industries, chemical process by-products not economically utilizable and oil materials. Compounding the problem is the ever increasing amount of wastes of all kinds being produced. In addition, nearly all pollution control processes result in the production of solids, sludges, or liquids with a higher concentration of pollutants than originally existed in the waste stream. Also, some wastes are the result of other waste treatment processes, and some are unwanted or non-recycled process by-products.

Packaging materials, garbage, and other combustible matter may be disposed of in part by incineration, but this in itself involves problems such as the evolution of air pollutants, including toxic substances, from the incinerators, the costs of moving the waste to the incinerators, emission of objectionable odors, and the disposal of the incinerator residues. In addition, at the present time, incineration is not always a politically viable alternative for disposal of waste.

Other major sources of waste products include disposable items as women's wear, aprons, towels, and particularly, hospital items including gowns, disposable bedding, disposable items used for mass feeding in institutions, baby diapers, and adult incontinent wear.

Non-combustible wastes, such as glass and metal containers, and non-biodegradable plastics are obviously more difficult to dispose of than are combustible wastes.

As for human wastes, as late as 1945, it was the accepted practice of many municipalities to dispose of human waste by flushing or dumping the waste into bodies of water with reliance upon the dissolved oxygen content of the water to effect biological purification. With the development of the concepts of environmental control, there was increasing public condemnation of such pollution of streams and lakes which resulted in the development of methods, such as the activated sludge process, of treating municipal sewage that are less subject to objection.

Such wastes as garbage, metallurgical slag, glass and metal containers, and other municipal and industrial solid waste have been used for many years as landfill. To some extent this disposition of such solid waste has been successful but it has likewise resulted in secondary pollution and health problems, and land so reclaimed may not in any event be suitable for certain purposes, such as building construction, because of the unstable nature of the filled land. That is, some types of solid wastes are physically or chemically unstable. Thus, garbage decomposes under the influence of natural factors, with release of objectionable odors, toxic or biologically harmful products which enter into the contiguous water table and make their way into nearby streams, thus creating a water pollution problem.

Moreover, experience has shown that even with the best so-called sanitary landfills there can also result insects, rodents, and disease problems, and even air pollution in the form of odors or smoke from refuse fires. Inevitable decomposition of non-permanent materials results in reduction of the volume of material used as landfill with resultant subsidence of the filled land. Subsidence can also occur when metals are gradually corroded with volume reduction, and this is exaggerated in the case of large hollow objects such as automobile bodies, metal cans, and drums. The burning of worn out automobile tires creates hugh volumes of objectionable, sooty smoke, and even if such tires are buried there may be a tendency for them to rise to the surface of the filled land after a period of time. Moreover, even if the subsidence referred to does not occur, land so filled may be insufficiently compacted or stable to support various types of structures.

U.S. Pat. No. 3,837,872 issued Sep. 24, 1974 to Connor addressed some of the deficiencies with traditional landfill methods. The '872 process concerns treatment of sewage sludge and other wastes by chemical fixation and physical entrapment of pollutants. The waste is treated by mixing it with a setting agent and silicate. The resulting product is a friable, clay-like mass having a polymer lattice that entraps and prevents migration of toxic materials such as heavy metals and some organics.

Unfortunately, typical sewage contains a broad variety of pathogens such as bacteria, fungi, viruses, parasites, and protozoans. If significant amounts of pathogens are present, use of such material as landfill, fertilizer or erosion material can be dangerous.

The U.S. Environmental Protection Agency (EPA) has recognized the problems which disposal of pathogen infested waste can present. In response to these problems, the EPA has issued guidelines at 40 C.F.R. § 257 concerning land disposal of sewage sludge which contains pathogens. The EPA regulations recognize three separate categories of sludge: unstabilized sludge, sludge exposed to a process to significantly reduce pathogens (PSRP), and sludge exposed to a process to further reduce pathogens (PFRP). "Unstabilized sludge" has not been exposed to any pathogen reducing process, is not suitable for land disposal, and can only be incinerated, buried or heat dried. Sludge which undergoes a PSRP, such as anaerobic digestion, heat treatment, lime stabilization, or air drying can be disposed on land only if public access to the land is controlled for a period of from twelve to eighteen months. Finally, sewage which has undergone a PFRP has no disease related restrictions on reuse. Unfortunately, to destroy some parasites, such as the ascarid, PFRP methods require either expensive, highly energy intensive processes such as radiation or thermal processing which are generally unsuitable for transforming the sewage sludge into a readily reusable end product, or if utilizing lower energy levels, require longer processing times. The ascarid is a helminth worm that is a common parasite in the intestines of humans and animals. Particularly susceptible to helminthiasis (intestinal infestation with helminth) are ruminants such as sheep, cattle, goats, pigs, horses, and mules. A wide variety of anti-helminthic agents have been discovered, and they have varying degrees of efficacy.

Among the classes of materials which are known to be toxic to helminth such as ascarid (*Ascaris fuum, Alumbricoibes*) are the two substituted benzimidazoles of U.S. Pat. No. 3,325,356, phosphoramidates of U.S. Pat. No. 4,269,829, acetyl and carbalkoxythioureidobenzophenones of U.S. Pat. No. 4,310,537, and avermectin and milbemycin compounds of U.S. Pat. No. 4,547,491. Such compounds, however, are intended for therapeutic use in individual animals and are unsuitable for general addition to sewage sludge.

Ammonia is also known to be toxic to ascarides. For example, Tropical Diseases Bulletin, Vol. 76, No. 3, Abstract 556, and Helminthological Abstract Series A, Vol. 45, No. 11 (1976), Abstract 5830 and Vol. 47, No. 3, Abstract 1272, disclose that treatment of sewage with 3–4% ammonia by volume destroys all visible ascarides present. Reducing the ammonia concentration to 2%, however, left many of the eggs viable.

Other researchers have found that relatively high volumes of ammonia are toxic to ascarides. Part of the problem encountered by the researchers, however, has been that ammonia evaporates and reduces the concentration of toxic ammonia present to combat ascarides.

Reimers et al, U.S. EPA Publication No. 600/S2/81/166 (October 1981), Order No. PB 82-102 344 discloses that conventional sludge treatment processes (mesophilic and anaerobic or aerobic digestion) are not very effective in destroying parasite eggs, and ammonification studies of ascarides were inconclusive. In another study, Reiners et al found that when ammonium sulfate at a dosage of 50 milligrams ammonia per gram of sludge was added to sludge previously aerobically digested at 25° C. for ten days, there was little effect on the ascarid eggs during the first five days. After ten days, 62% of the eggs were inactivated. When the ammonia concentration was increased to 500 milligrams per gram solids, complete or near complete inactivation was observed after ten days. When ammonia gas was added to sludges previously aerobically digested at 25° C. at detention times of 10, 20, or 30 days, a dosage of 1% ammonia was necessary to obtain effective inactivation of the ascarid eggs. See, U.S. EPA Publication No. 600/S1/185/022 (January 1986) Order No. PB86-135 407/AS.

A serious problem with ammonification of sewage sludge is that a large enough amount of ammonia must be added to the sludge to kill ascarides within a reasonable period of time. It was previously thought that at least 2% ammonia by volume was required to effectively destroy most viable ascarides in sludge within ten days. If the sludge was not sealed in an airtight reaction vessel, however, additional amounts of ammonia were required to compensate for volatilization.

U.S. Pat. No. 4,793,927, issued Dec. 27, 1988 to Meehan et al discloses that the above described '872 patent process does reduce viability of ascarid eggs in sewage sludge by the highly alkaline environment of the chemical fixation process which hydrolyses nitrogen containing waste in the sludge to evolve some ammonia to kill some ascarid eggs. It is stated that the '872 process, however, still leaves about 60% of the ascarid eggs viable. Waste containing such a high percentage of viable ascarid eggs fails to satisfy environmental regulations for substantial elimination of parasites from treated sludge which is to come into contact with humans or their food chain. For safety and in order to qualify as a PFRP, at least about 99.9% of viable parasites must be destroyed. The level of indicator pathogens in a spike sample must be reduced by three logs. Such a test is designed to ensure that actual municipal sludge treated with the process will substantially eliminate all the parasites, and the '872 process would not qualify.

The '927 patent describes the '872 process as effective in satisfying the EPA requirements for a PFRP with respect to bacteria and viruses, because the highly alkaline environment produced by the '872 process is toxic to bacteria and viruses, reducing their total coliform at least three logs such that less than 0.1% of them survive the treatment.

To improve upon the '872 process, the '972 patent discloses a method of treating sewage which includes the steps of mixing the sewage with a source of material toxic to parasites, preferably an ammonia source, and forming a substantially and permeable mass from the mixture of sewage and source of toxic material. In a preferred embodiment, the mixture of sewage and ammonia source are formed into an impermeable mass by mixing the sewage with a silicate and a setting agent in sufficient proportion to form a substantial and permeably mass.

While the '927 process does overcome the major deficiency of the '872 process with respect to the ascarid eggs, the '927 process itself suffers from several major deficiencies. First, the reaction between the setting agent, the silicates and the waste produce a matrix structure whose structural strength needs improving. Second, due to the nature of the reaction and the temperatures achieved in the reaction, an objectional amount of ammonia is retained in the waste, such that if it is used as landfill, objectionable amounts of ammonia may be detected at the surface of the landfill. Finally, both the '872 and the '927 processes produce a treated product that comprises 35–40% solid. Many environmental regulations require a solids content of at least 50% if not higher. Of course this solids content can be achieved by, for example, evaporation but will require more time and/or energy to achieve such a solids content.

Therefore, there is a need for a waste treatment process that will produce a stronger waste product, having a reduced amount of retained ammonia, and having a higher solids content.

SUMMARY OF THE INVENTION

According to one embodiment of the present invention, there is provided a method of treating an aqueous waste stream comprising solid waste and pathogens to render the waste stream suitable for ultimate disposal. The method comprises first contacting together in a reaction mixture the waste stream, an ammonia source capable of evolving ammonia for treating the waste, a pozzolanic reactant comprising $Ca(OH)_2$, pozzolanic chemicals consisting of $SiO_2$, $Fe_2O_3$, and $Al_2O_3$, and at least one pozzolanic accelerator selected from the group consisting of anionic metal silicates, anionic carbon compounds, anionic boron compounds (borate family, anionic phosphorous compounds (phosphate family) and gelling enhancers, in a manner suitable to cause pozzolanic stabilization reactions to occur thereby increasing the solids percentage of the reaction mixture. Next, the reaction mixture is allowed to reach a target temperature of at least about 90° F., to reach a pH of at least about 11.5, and to evolve ammonia gas, thereby forming a heated mixture. Finally, the exposed surface area to mass ratio of the solids in the heated mixture is increased in a manner suitable to release the evolved ammonia gas, thereby neutralizing a substantial portion of the pathogens present in the waste stream and forming a treated waste stream that is suitable for ultimate disposal.

The equation $F(X) = (1.94 + 0.769(\log X) - 0.244 (\log X)^2$ describes the action of Y in terms of the time element X.

Figure 2:
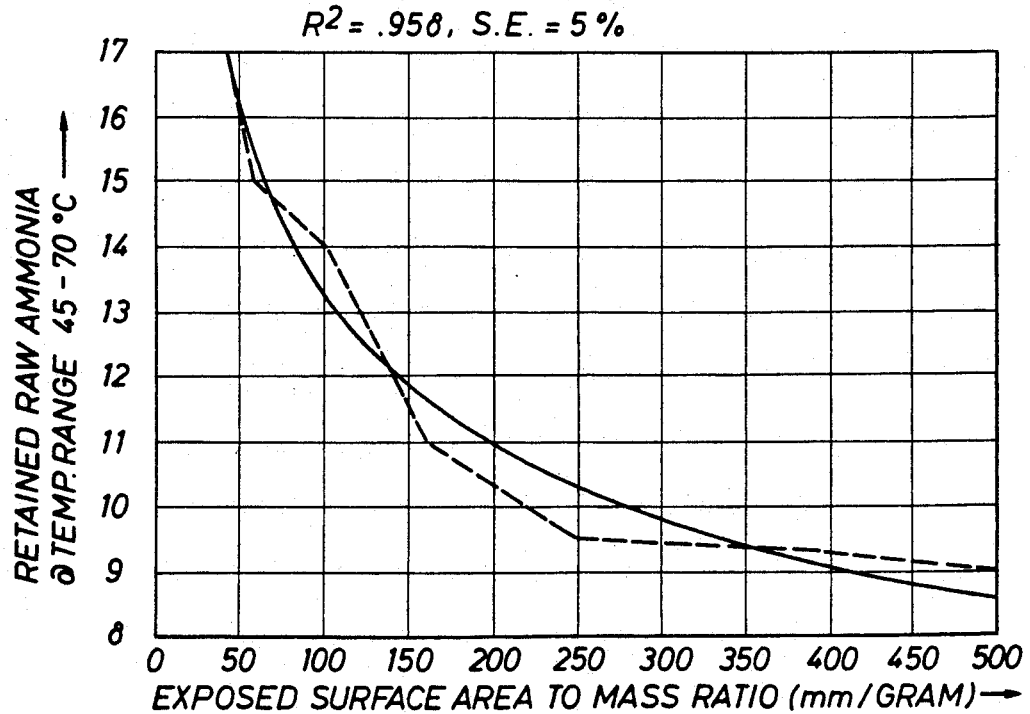

FIG. 2 is a plot of retained ammonia (Y) as a percent of the original quantity in the raw versus (X) the exposed surface area to mass ratio of the shredded treated sludge. The regression equation that describes this action has a 0.958 fit factor and is:

$$F(X) = 45.59(X^{.269})$$

Figure 3:
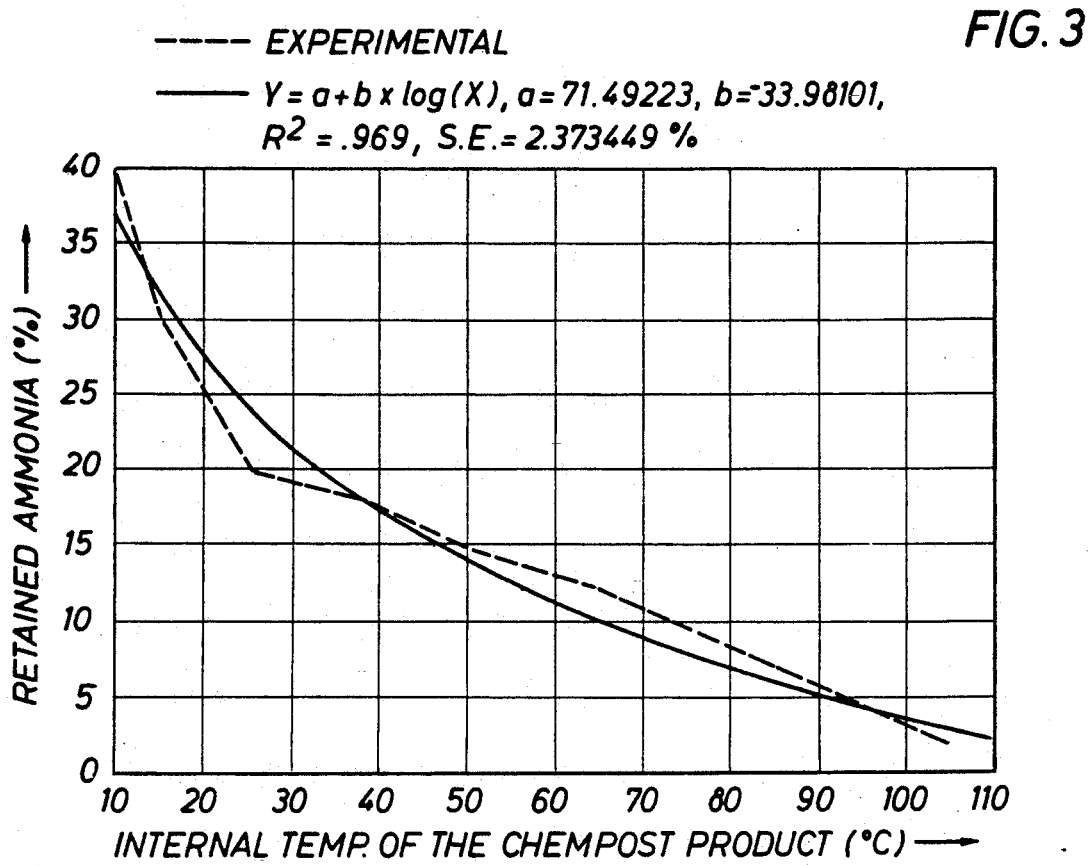

FIG. 3 is a plot of internal temperature (C°) of the curing treated biosolids (X) versus the percent retained ammonia (Y) based upon the 100% total in the initial raw biosolids. The regression equation that describes this action has a fit factor of 0.969 and is:

$$F(X) = 71.49 - 33.98 (\log (X))$$

Figure 4:
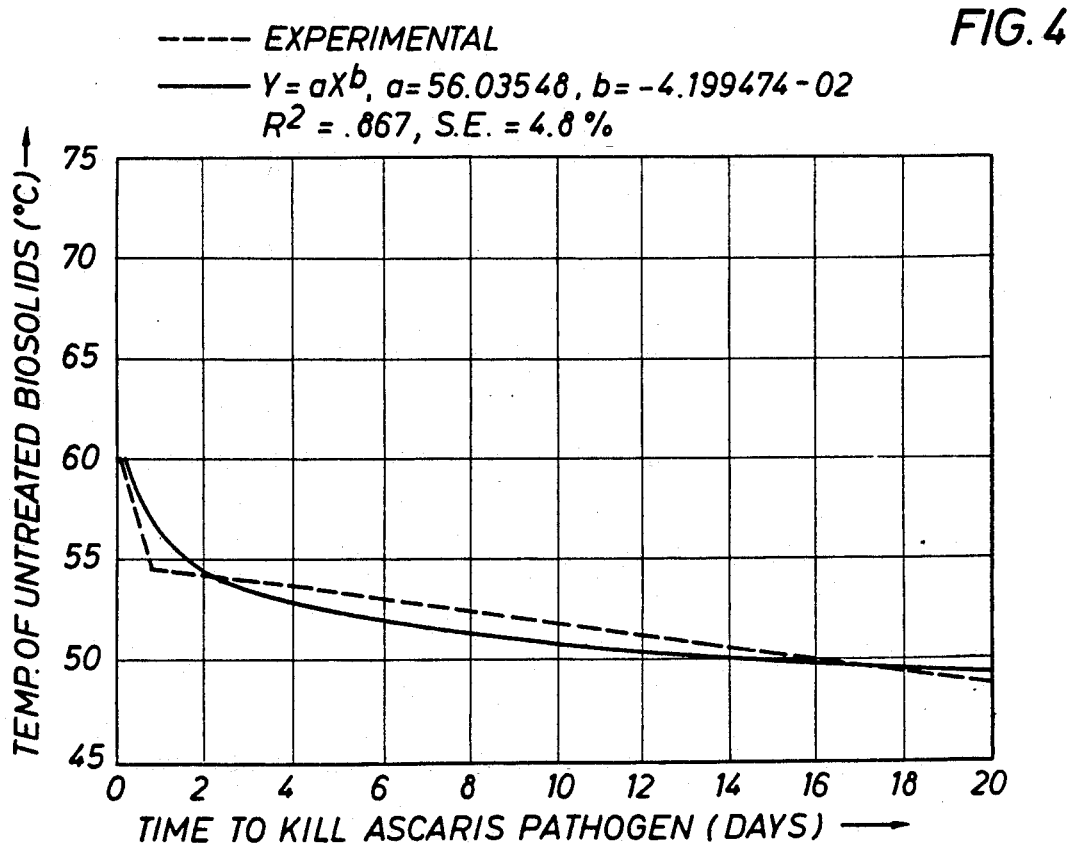

FIG. 4 is a plot of the time in days (X) to kill ascaris pathogens versus the internal mass temperature (Y) of the biosolids without regard to retained ammonia content or elevated pH of the treated biosolids. The regression equation that describes this action has a fit factor of 0.867 and is:

$$F(X) = 56.04(X^{-4.2E-02}).$$

Figure 5:
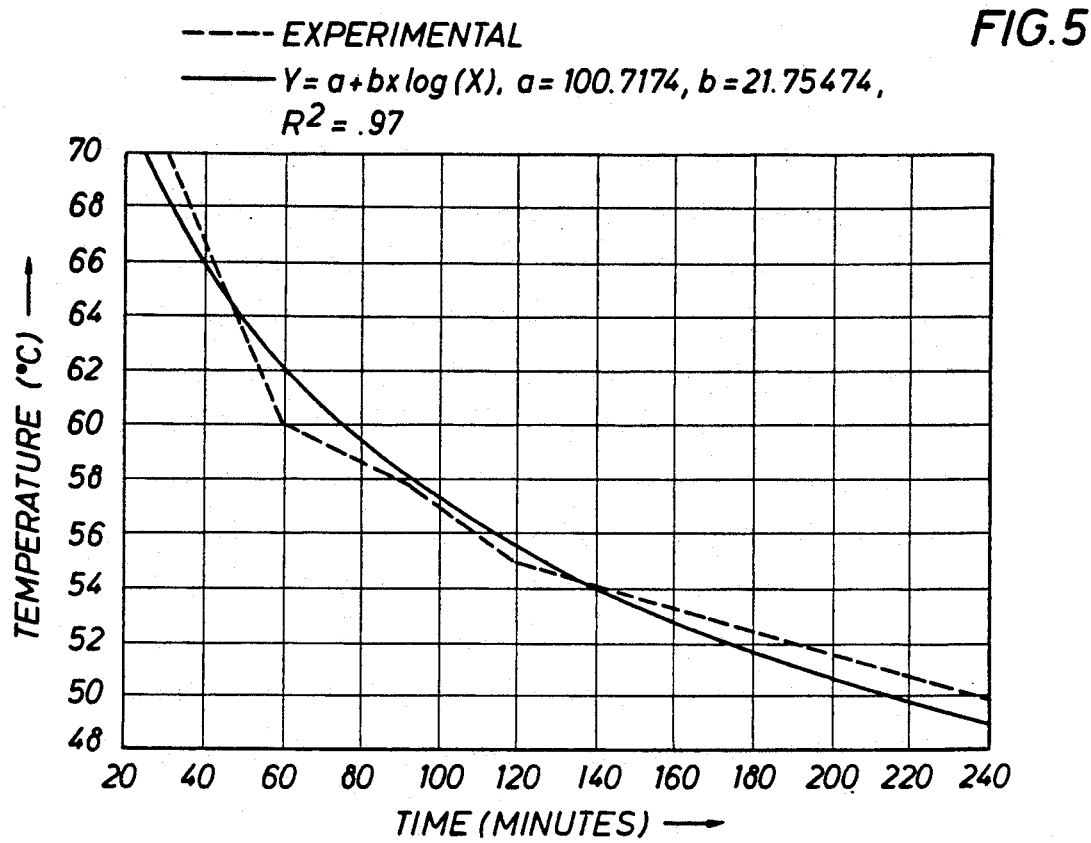

FIG. 5 is a plot of the effect of time (X) and temperature (Y) on the killing of the Ascaris pathogens when combined with a typical range of ammonia content to be found in freshly treated biosolids with the proposed technology. The regression equation that describes this action has a fit factor of 0.97 and is:

$$Y = 100.7174 - 21.75 (\log X)$$

FIG. 6 is a plot of a multilinear regression equation that expresses the killing time as a function of variable temperature (X) and contained ammonia (Y) during the cure cycle which is as follows:

$$F(X, Y) = 1074 - 18.5(X) - 0.065(Y)$$

Figure 7:
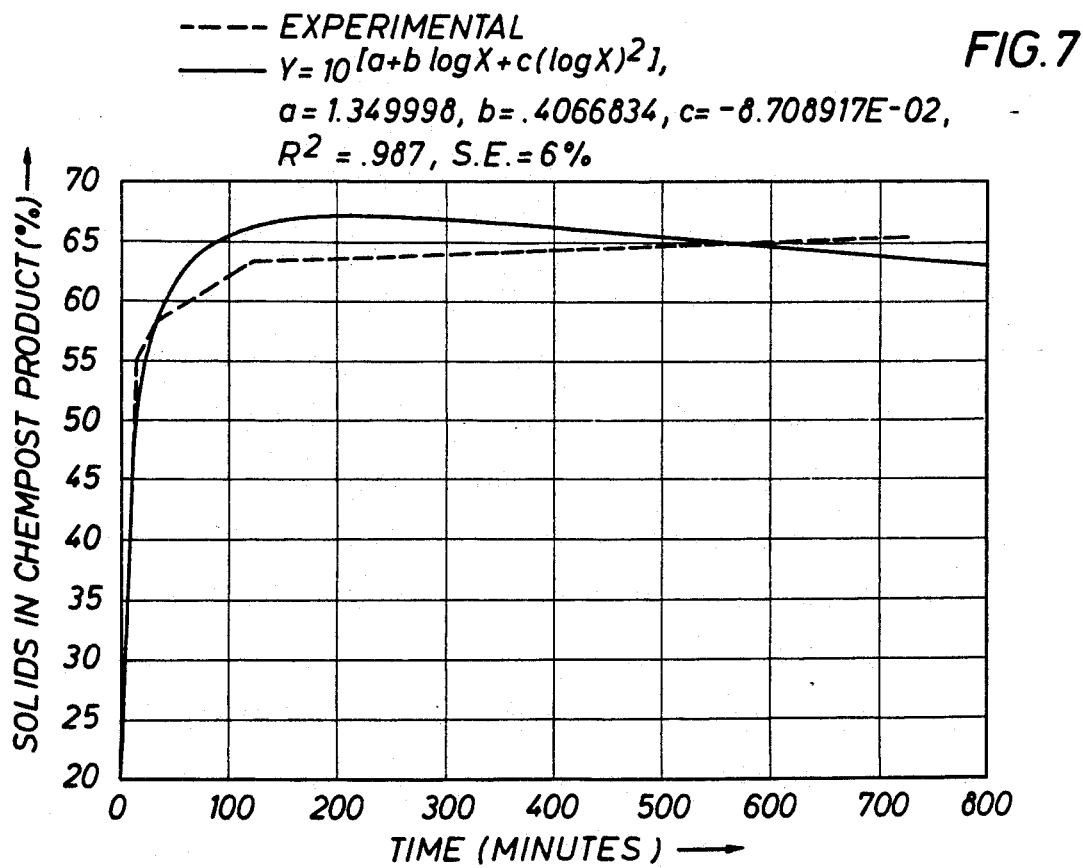

FIG. 7 is a plot of the effect of time (X) on the percent increase in solids content of the ChemPost TM (Y) as the recommended Chemset TM reagents are added to typical secondary wastewater biosolids (% solids 20-24). The regression equation that describes this data is shown as has a fit factor of 0.987:

$$F(X) = (1.35 + 0.407(\log X) + -0.871E\text{-}02(\log X)^2$$

Figure 8:
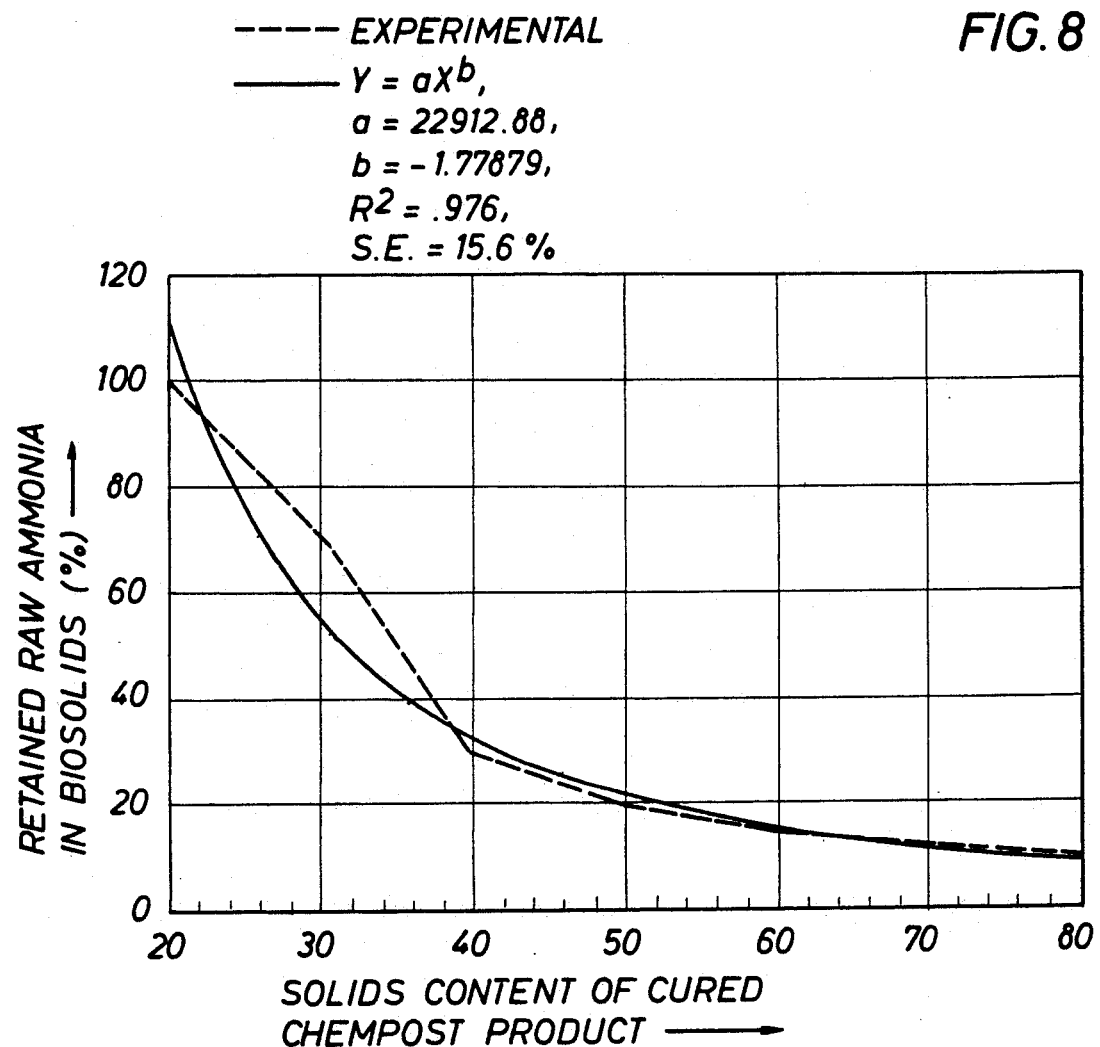

FIG. 8 is a plot of the solids content of cured ChemPost TM (X) versus the retained ammonia in the ChemPost TM as a percentage of the initial raw biosolids ammonia content (Y). The fit factor for the regression equation shown below is 0.976:

$$F(X) = 22912.9(X^{-1.779})$$

DETAILED DESCRIPTION OF THE INVENTION

In accordance with the present invention, commercial or domestic waste, an ammonia source, a pozzolanic reactant, pozzolanic chemicals, and at least one pozzolanic accelerator are contacted together in a reaction mixture in such a manner that pozzolanic stabilization reactions occur, causing the reaction mixture to undergo consolidation and stabilization. The essential pozzolanic stabilization reactions are shown by the following equations 1-4:

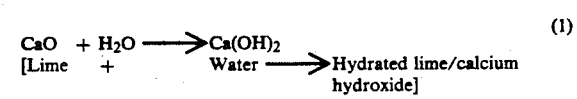

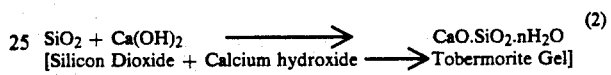

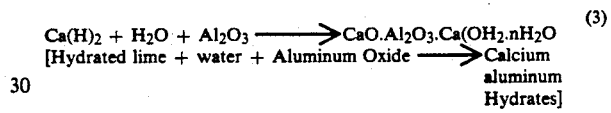

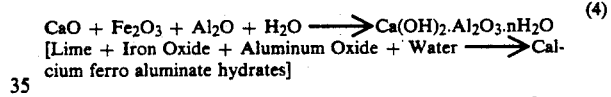

The waste that may be processed in this invention includes the types of waste described above in the background, as well as waste from other treatment processes. Waste from other waste treatment process includes waste from primary, secondary and tertiary treatment facilities. The waste processed in the present invention can generally be considered an aqueous sludge. Preferably the aqueous sludge processed in the present invention will have in the range of about 15 to about 35 weight percent solids.

The ammonia source utilized in the present invention must be capable of evolving ammonia for treatment of waste. Although not always true, it is generally the case that the waste processed in the present invention will contain an ammonia gas source. Therefore, the ammonia source utilized in the present invention may be supplied from the waste itself, from an external source, or both. Suitable ammonia sources for use in the present invention include ammonium salts, ammonium hydroxide, anhydrous ammonia, amines, organic compounds containing at least one amine functional group, and compounds with at least one terminal amine.

Generally in order to effectively neutralize the pathogens, an amount of ammonia gas of at least 0.05 weight percent based on the water content of the waste must be generated. Preferably, an amount of gas in the range of about 0.1 to about 1.0 weight percent waste is generated.

Any pozzolanic reactant that will provide the structural strength can be utilized in the present invention. Preferably, the pozzolanic reactant utilized in the present invention is calcium hydroxide. While calcium hydroxide can be introduced into the reaction mixture, it is preferable to form at least a portion of the required calcium hydroxide in situ in the reaction mixture by reacting calcium oxide and water. The calcium oxide will react with some of the water in the waste sludge, thereby helping to increase the solids content of the mixture. Furthermore, the reaction of calcium oxide and water is an exothermic reaction which, along with the other exothermic reactions of calcium oxide with any of the pozzolans, causes the temperature of the reaction mixture to rise without the necessity of providing heat to the reaction mixture from an external source. This temperature rise helps to speed up the pozzolanic stabilization reactions and contributes to ammonia gas evolution. This temperature rise also provides heat to aid in the neutralization of pathogens.

The pozzolanic chemicals (pozzolanic chemicals are sometimes referred to as "pozzolans") utilized in the present invention comprise $SiO_2$ and at least one selected from the group of $Fe_2O_3$ and $Al_2O_3$. Preferably, the pozzolans comprise $SiO_2$, $Fe_2O_3$ and $Al_2O_3$. The pozzolanic chemicals may be provided from any suitable source provided that the essential pozzolanic reactions shown above will readily occur. Preferably, at least a portion of the pozzolanic chemicals are provided for by the use of coal fly ash. An example of a suitable coal fly ash is the F-type coal fly ash shown below.

|  | F Type<br>Coal Fly Ashes<br>(percent by weight) |
| --- | --- |
| CaO | 1-3 |
| Free Lime | 0-2 |
| $CaSO_4$ | 0 |
| $SiO_2$ | 40-55 |
| $Al_2O_3$ | 20-30 |
| $Fe_2O_3$ | 5-10 |
| $SO_3$ | 0.5-3 |
| MgO | 1-4 |
| $Na_2O/K_2O$ | 0-1 |
| LOI | 1-15 |

The pozzolanic reactant and the pozzolanic chemicals together generally comprise in the range of about 15 to about 60 percent of the reaction mixture, based on the water content of the waste. Preferably, the pozzolanic reactant and the pozzolanic chemicals together generally comprise in the range of about 20 to about 50 percent of the reaction mixture, and most preferably in the range of about 25 to about 40 weight percent, based on the water content of the waste.

The ratio of pozzolanic chemical to pozzolanic reactant generally is in the range of about 10:1 to about 1:10. Preferably, the ratio of pozzolanic chemical to pozzolanic reactant is generally in the range of about 5:1 to about 1:1, and most preferably in the range of about 4:1 to about 3:2.

The reaction mixture also comprises at least one pozzolanic accelerator selected from the group consisting of anionic metal silicates, anionic carbon compounds, anionic boron compounds (borate family), anionic phosphorous compounds (phosphate family), and gelling enhancers. Preferably, the at least one pozzolanic accelerator is selected from the group consisting of anionic metal silicates. Suitable anionic metal silicates include alkali metal silicates. Although any alkali metal silicates could be used, cost and availability are major factors to be considered. For example, potassium silicate and lithium silicate are suitable, but they are too expensive to be practical and are often difficult to obtain. On the other hand, sodium silicate is ideal because it is the least expensive and is generally available in either liquid or solid form. The solid silicate is available in a variety of radios of $Na_2O$ to $SiO_2$.

The pozzolanic accelerators generally comprise in the range of about 0.1 to about 20 weight percent of the reaction mixture, based on the wet weight of the waste. Preferably, the pozzolanic stabilizers comprise in the range of about 0.5 to about 10 weight percent, and most preferably in the range of about 1 to about 8 weight percent, based on the wet waste.

In a commercial design, reactants of the reaction mixture are generally contacted together in an air tight reactor or a mixing vessel. Retention time in the reactor is generally long enough to initiate the pozzolanic reactions and initiate solids build up. Generally the retention time in the reactor is in the range of about 3 minutes to about 24 hours. Preferably, the retention time is in the range of about 5 to about 60 minutes, and most preferably in the range of about 10 to about 30 minutes.

Upon exiting the reactor, the reaction mixture generally has a solids content of at least about 40 weight percent solids. Preferably, upon exiting the reactor, the reaction mixture has a solids build up of at least about 45 weight percent solids, and most preferably, of at least about 50 weight percent solids.

Once the reactants have been contacted together and the pozzolanic stabilizations initiated, it is necessary to allow the reaction mixture to reach a certain target temperature and a pH of at least about 11.5.

If the present process is utilized as a batch process, the temperature rise to at least about 90° F. and as high as 160° F., could be achieved in the reactor. However, if the present process is utilized as a continuous process, the temperature rise to at least about 90° F. will generally not be achieved in the reactor, since the incoming waste will provide cooling to the reaction. Thus it is generally necessary to transfer the reaction mixture into a second vessel, which is a holding vessel or plug flow reactor, in which the temperature is allowed to rise to at least about 90° F. The heat supplied from the exothermic reactions of calcium oxide with water and from calcium hydroxide hydrolysis of silicon, aluminum and iron compounds, should be sufficient to heat the reaction mixture to at least about 90° F and even to at least as high as 160° F. It may be necessary to insulate the reactor or the holding vessel so that the temperature will reach the desired target temperature. In addition to the heat from the exothermic reaction of calcium oxide, water, and pozzolans, additional heat from an external source may be provided.

Higher temperatures are necessary to reduce the amount of ammonia that will be retained in the reaction mixture solids and thus minimize any objectionable ammonia odor for processed waste utilized as landfill. It is generally necessary that a temperature of at least about 90° F. be achieved to minimize objectionable ammonia in processed waste utilized as landfill. Preferably, a temperature of at least about 100° F. is achieved, more preferably, a temperature of at least about 110° F., and even more preferably, a temperature of at least about 120° F., is achieved.

The second vessel allows time for temperature to build, solids to build and for ammonia to be evolved, yet trapped in the mass of treated biosolids thereby assisting in the pathogen killing activities of the high pH and temperature.

Ammonia can be recycled from the degasser through the second vessel if needed or ammonia gas from external source could be added at this stage to increase ammonia content in low ammonia waste, if desired.

The second vessel is preferably insulated to retain heat and can be provided with any suitable heating means, for example an electric exterior wrap, if an increase in the temperature is desired for any reason such as faster cure, due to very cold ambient temperature of the biosolids being treated.

The pH rise to 11.5 is generally achieved rather rapidly and may even occur in the reactor in a continuous process. Whether the reaction mixture reaches a pH of at least about 11.5 in the reactor or in the holding vessel is not critical. The important thing is that the reaction mixture reach a pH of at least about 11.5 at some point. The waste processed in the present invention is generally close to neutral in pH with ammonium commonly present in the waste. Alkaline pHs are necessary to evolve ammonia gas from ammonia. Highly alkaline pH's are necessary in order to neutralize bacteria and viruses.

Retention time in the holding vessel must be sufficient for the reaction mixture to reach a pH of at least about 11.5 and a temperature of at least about 110° F. Generally the retention time in the holding vessel is in the range of about 0.1 minutes to about 24 hours. Preferably, the retention time in the holding vessel is in the range of about 0.5 minutes to about 120 minutes, and most preferably in the range of about 1 minute to about 30 minutes.

Once the ammonia gas has evolved, it is necessary to facilitate its release from the processed waste. This is achieved by controlling the exposed surface area of the solids in the reaction mixture so that the ammonia gas may be quickly released. Generally, the exposed surface area to mass ratio of the solids in the reaction mixture is at least 40 mm$^2$/g. Preferably, the exposed surface area to mass ratio of the solids in the reaction mixture is in the range of about 60 to about 50 mm$^2$/g, and most preferably, in the range of about 80 to about 200 mm$^2$/g, allowing for the quick release of ammonia from the reaction mixture. To achieve the desired exposed surface area to mass ratio, the solids in the reaction mixture are generally subjected to an apparatus such as a mass shredder/mixer. An example of a commercially available mass shredder/mixer includes Model No. 7000 from Disposal Waste Systems, Inc.

The retention time in the mass shredder/mixer is generally in the range of about 0.1 minutes to about 24 hours. Preferably, the retention time in the mass shredder/mixer is in the range of about 0.5 to about 120 minutes, and most preferably in the range of about 1 to about 60 minutes.

The quick release of the ammonia gas in the mass shredder/mixer/degasser contributes to the neutralization of pathogens, especially the ascarid. The quick release of ammonia gas also helps to increase the solids content of the processed waste. The solids content of the waste as it leaves the mass shredder/mixer/degasser is generally at least about 50 weight percent. Preferably, the solids content of the waste as it leaves the mass shredder/mixer/degasser is at least about 55 weight percent, more preferably at least about 60 weight percent, and even more preferably, at least about 65 weight percent.

While the majority of the ammonia gas will be released in the mass shredder/mixer/degasser, some ammonia gas is also released in the reactor and in the holding vessel. Generally each of these vessels will be provided with an ammonia purge line under slight back pressure (<2 psi) so as to maintain maximum ammonia content in the freshly produced material so that the optimum pathogen killing conditions can be achieved. The purge line will be vented to conventional ammonia scrubbers. The ammonia may be recovered for other uses.

During this process of temperature and solids rise as well as ammonia evolution, the pozzolanic reactions are binding heavy metals that are typically found in waste water sludges, especially in sludges generated from large industrially oriented cities. Alkaline stabilization through traditional additions of lime can precipitate metals thereby reducing solubilities. An improvement over the traditional methods is shown in U.S Pat. No. 3,837,872. The method of the '872 patent depends upon pozzolanic (calcium, silicate, etc.) reactions to form the stable end products. Stabilized waste water sludge made using the method of the present invention will allow for long term stability of the metals fixed in the end product. The mechanisms for this are the result of the high reserve alkalinities provided by the chemical reactions shown below. In typical lime or hydroxide precipitation reactions all of the reserve alkalinity is provided by the hydroxyl (—OH$^-$) radicals. In the method of the present invention, the high quantity of calcium aluminate and calcium aluminate ferrite hydrate complexes, in combination with anionic silicate or carbon or boron accelerators, provide numerous sources of alkalinity. As these matrixes age and become neutralized, the pozzolanic complexes split into smaller anions providing additional reserve alkalinity capacity. This can be demonstrated by testing the stabilized product with continuing leaching procedures. One such procedure is called the Multiple Extraction Procedure where ten mass parts of stabilized sludge is tumbled for 24 hours with 20 mass parts of a 0.5N solution of acetic acid. The sludge is filtered and then retumbled for 24 hours with the 10 to 1 mass parts of a 0.2N synthetic acid rain mixture made of sulfuric and nitric acid. This is repeated over and over until a total of 9 synthetic acid rain extractions have been performed. The extraction fluids are replaced between each extraction cycle. The fluid is tested for the presence of metals and for pH. The final pHs of the extraction fluids will remain above 10 throughout thereby indicating the continued release of alkalinity by the stabilized product.

EXAMPLES

Example 1

100 parts of typical secondary sludge, earlier dewatered to about 18–25% solids [for optimum cost effectiveness] is used. The temperature of the sludge is best if maintained above 10C. prior to mixing treatment chemicals such that the processing time is optimized.

To this 35%, by weight of the total weight of the sludge, CHEMSET TM reagent blend, GF285 is added. This blend is comprised of 28.5% by weight calcium oxide and 72.5% ASTM Coal Fly Ash type F. The mixture is thoroughly combined and prior to exiting the main mixing reactor 3% by weight of the total sludge is added CHEMSET TM C-220. This is a pozzolanic accelerator and is a sodium silicate solution of about 35% by weight SiO$_2$.

The treated mass is extruded from the main reactor/mixer into a closed vessel that is essentially a plug flow reactor. This is a vertical vessel which is fed from the bottom and evacuated from the top. The vessel is of such size to allow at least 15-30 minutes residence time during which the pH of the mass is allowed to optimize at near 12.5 and the temperature of the reactions is allowed to build into the 50 C. range and higher. These conditions convert ammonium ions to ammonia gas which then attempts to release. The plug flow conditions within the plug flow reactor combined with the back pressure device on the vent line allows the free ammonia within the biosolids mixture to optimize.

As the treated product is forced out of the top of the plug flow reactor it travels completely enclosed to a shredder/delumper device such as a pin mixer where the particle size is reduced into the optimum range immediately prior to passing through a degasser chamber where ambient or slightly warmed air is passed a slight negative pressure thereby striping the ammonia gas into the ammonia scrubbing system. A second section of the degasser passes cool air which reduces the temperature of the mass to below 35 C. so that the remaining ammonia gas, which is soluble in the remaining moisture in the treated sludge, does not continue to evolve at a rate that produces foul odors.

Example 2

100 parts of dewatered sludge is used to which is added 10 parts of calcium oxide and 25 parts of ASTM C type coal fly ash. The mixture is thoroughly combined and prior to exiting the main mixing reactor 3% by weight of the total sludge is added CHEMSET TM C-220. This is a pozzolanic accelerator and is a sodium silicate solution of about 35% by weight $SiO_2$.

As in Example 1, the treated mass is extruded from the main reactor/mixer into a closed vessel that is essentially a plug flow reactor. This is a vertical vessel which is fed from the bottom and evacuated from the top. The vessel is of such size to allow at least 15-30 minutes residence time during which the pH of the mass is allowed to optimize at near 12.5 and the temperature of the reactions is allowed to build into the 50 C. range and higher. These conditions convert ammonium ions to ammonia gas which then attempts to release. The plug flow conditions within the vessel combined with the back pressure device on the vent line allows the free ammonia within the biosolids mixture to optimize.

As the treated product is forced out of the top of the plug flow reactor it travels completely enclosed to a shredder/delumper device such as a pin mixer where the particle size is reduced into the optimum range immediately prior to passing through a degasser chamber where ambient or slightly warmed air is passed a slight negative pressure thereby striping the ammonia gas into the ammonia scrubbing system. A second section of the degasser passes cool air which reduces the temperature of the mass to below 35 C. so that the remaining ammonia gas, which is soluble in the remaining moisture in the treated sludge, does not continue to evolve at a rate that produces foul odors.

Example 3

100 parts of dewatered primary sludge (28-35% solids) is used to which is added 8 parts of calcium oxide 18 parts of type ATM F coal fly ash. Prior to exiting of the main reactor a mixture of accelerators CHEMSET TM C-220 and S-106 is added. This combination allows for the increase in the retention of cationic heavy metals within the sludge which acceleration the main strength building pozzolanic chemical reactions. The mixture is thoroughly combined and prior to exiting the main mixing reactor 3% by weight of the total sludge is added CHEMSET TM C-220. This is a pozzolanic accelerator and is a sodium silicate solution of about 35% by weight $SiO_2$.

Again, as in the examples above, the treated mass is extruded from the main reactor/mixer into a closed vessel that is essentially a plug flow reactor. This is a vertical vessel which is fed from the bottom and evacuated from the top. The vessel is of such size to allow at least 15-30 minutes residence time during which the pH of the mass is allowed to optimize at near 12.5 and the temperature of the reactions is allowed to build into the 50 C. range and higher. These conditions convert ammonium ions to ammonia gas which then attempts to release. The plug flow conditions within the reactor combined with the back pressure device on the vent line allows the free ammonia within the biosolids mixture to optimize.

As the treated product is forced out of the top of the plug flow reactor it travels completely enclosed to a shredder/delumper device such as a pin mixer where the particle size is reduced into the optimum range immediately prior to passing through a degasser chamber where ambient or slightly warmed air is passed a slight negative pressure thereby striping the ammonia gas into the ammonia scrubbing system. A second section of the degasser passes cool air which reduces the temperature of the mass to below 35 C. so that the remaining ammonia gas, which is soluble in the remaining moisture in the treated sludge, does not continue to evolve at a rate that produces foul odors.

Example 4

100 parts of dewatered secondary sludge (15-20% solids) is used to which is added 12% calcium oxide and 23% type F coal fly ash. The extra calcium oxide is used to bind some extra water content within the sludge as well as compensate for particularly cold weather conditions. The mixture is thoroughly combined and prior to exiting the main mixing reactor 3% by weight of the total sludge is added CHEMSET TM C-220, which functions as the accelerator and is a carbon based accelerator. This is a pozzolanic accelerator and is a sodium silicate solution of about 35% by weight $SiO_2$.

The treated mass is extruded from the main reactor/mixer into a plug flow reactor as described in the above examples. The plug flow conditions within the plug flow reactor combined with the back pressure device on the vent line allows the free ammonia within the biosolids mixture to optimize.

As the treated product is forced out of the top of the plug flow reactor it travels completely enclosed to a shredder/delumper device such as a pin mixer where the particle size is reduced into the optimum range immediately prior to passing through a degasser chamber where ambient or slightly warmed air is passed a slight negative pressure thereby striping the ammonia gas into the ammonia scrubbing system. A second section of the degasser passes cool air which reduces the temperature of the mass to below 35 C. so that the remaining ammonia gas, which is soluble in the remaining moisture in the treated sludge, does not continue to evolve at a rate that produces foul odors.

FIGS. 1-8 were generated from data gathered from the above described experimental examples.

Figure 1:
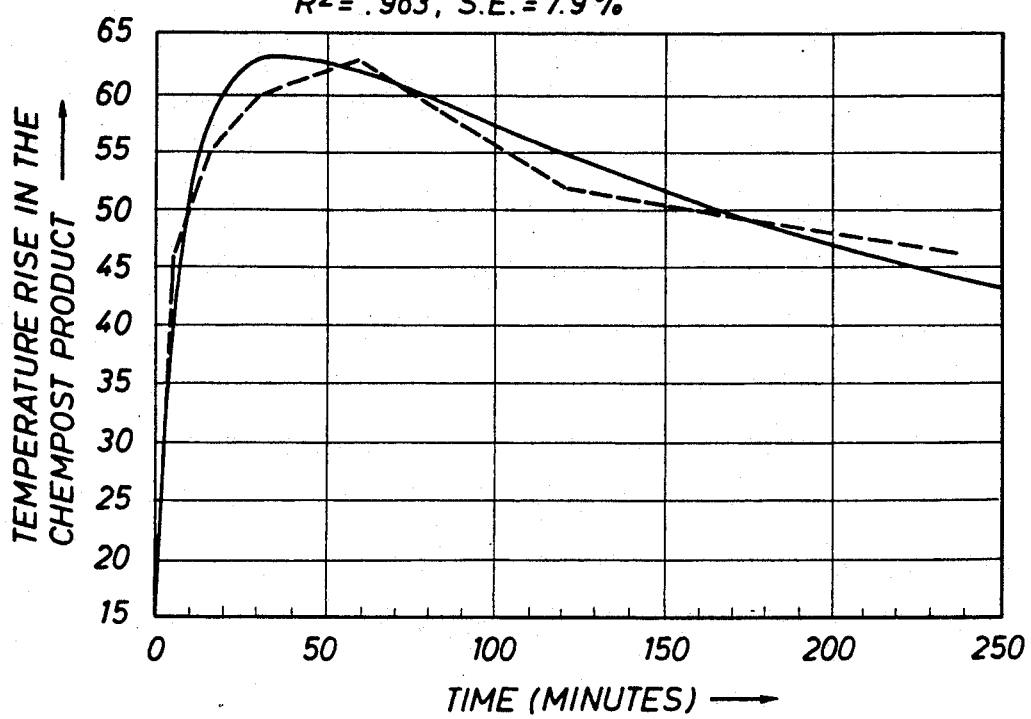
FIG. 1 is a plot of the temperature rise (Y) in the treated product mass versus time in minutes (X) as compared to a regression analysis curve. The regression curve matches the experimental data with a high correlation coefficient of 0.983. All the graphs below show the data curve and the regression fitting curve.

FIG. 1 is a plot of the temperature rise (Y) in the treated product mass versus time in minutes (X) as compared to a regression analysis curve. The regression curve matches the experimental data with a high correlation coefficient of 0.983. All the graphs below show the data curve and the regression fitting curve.

The equation $F(X) = (1.94 + 0.769(\log X) - 0.244(\log X)^2$ describes the action of Y in terms of the time element X.

FIG. 2 is a plot of retained ammonia (Y) as a percent of the original quantity in the raw versus (X) the exposed surface area to mass ratio of the shredded treated sludge. The regression equation that describes this action has a 0.958 fit factor and is:

$$F(X) = 45.59(X^{-.269})$$

FIG. 3 is a plot of internal temperature (C°) of the curing treated biosolids (X) versus the percent retained ammonia (Y) based upon the 100% total in the initial raw biosolids. The regression equation that describes this action has a fit factor of /969 and is:

$$F(X) = 71.49 - 33.98 \, (\text{LOG } (X))$$

FIG. 4 is a plot of the time in days (X) to kill ascaris pathogens versus the internal mass temperature (Y) of the biosolids without regard to retained ammonia content or elevated pH of the treated biosolids. The regression equation that describes this action has a fit factor of 0.867 and is:

$$F(X) = 56.04(X^{-4.2E-02}).$$

FIG. 5 is a plot of the effect of time (X) and temperature (Y) on the killing of the Ascaris pathogens when combined with a typical range of ammonia content to be found in freshly treated biosolids with the proposed technology. The regression equation that describes this action has a fit factor of 0.97 and is:

$$Y = 100.7174 - 21.75 \, (\log X)$$

FIG. 6 is a plot of a multilinear regression equation that expresses the killing time as a function of variable temperature (X) and contained ammonia (Y) during the cure cycle which is as follows:

$$F(X, Y) = 1074 - 18.5(X) - 0.065(Y)$$

FIG. 7 is a plot of the effect of time (X) on the percent increase in solids content of the ChemPost TM (Y) as the recommended Chemset TM reagents are added to typical secondary wastewater biosolids (% solids 20–24). The regression equation that describes this data is shown as has a fit factor of 0.987:

$$F(X) = (1.35 + 0.407(\log X) + -0.871E - 02(\log X)^2$$

FIG. 8 is a plot of the solids content of cured ChemPost TM (X) versus the retained ammonia in the ChemPost TM as a percentage of the initial raw biosolids ammonia content (Y). The fit factor for the regression equation shown below is 0.976:

$$F(X) = 22912.9(X^{-1.779})$$

I claim:

1. A method of treating an aqueous waste stream comprising solid waste and pathogens to render the waste stream suitable for ultimate disposal comprising:
   (a) contacting together in a reaction mixture the waste stream, an ammonia source capable of evolving ammonia for treating the waste, a pozzolanic reactant comprising $Ca(OH)_2$, pozzolanic chemicals comprising $SiO_2$ and at least one of $Fe_2O_3$ and $Al_2O_3$, and at least one pozzolanic accelerator selected from the group consisting of anionic metal silicates, anionic carbon compounds, anionic boron compounds, anionic phosphorous compounds, and gelling enhancers, in a manner suitable to cause pozzolanic stabilization reactions to occur thereby increasing the solids percentage of the reaction mixture;
   (b) allowing the reaction mixture of step (a) to reach a temperature of at least about 90° F., to reach a pH of at least about 11.5 and to evolve ammonia gas, thereby forming a heated mixture;
   (c) increasing the exposed surface area to mass ratio of the solids in the heated mixture in a manner suitable to release the evolved ammonia gas, thereby neutralizing a substantial portion of the pathogens present in the waste stream and forming a treated waste stream.

2. The process of claim 1 wherein the pozzolanic reactant and the pozzolanic chemicals comprise in the range of about 15 to about 60 weight percent of the reaction mixture and the at least one pozzolanic accelerator comprises in the range of about 0.1 to about 20 weight percent of the reaction mixture, both based on the weight of the aqueous waste stream, and wherein the ratio of pozzolanic chemicals to pozzolanic reactant is in the range of about 10:1 to about 1:10.

3. The process of claim 1 wherein in step (b) the temperature reaches at least about 100° F.

4. The process of claim 1 wherein the pozzolanic accelerator is selected from anionic metal silicates.

5. The process of claim 1 wherein the amount of evolved gas is at least about 0.05 weight percent based on the water weight of the waste.

6. The process of claim 1 wherein the pozzolanic reactant and the pozzolanic chemicals comprise in the range of about 20 to about 50 weight percent of the reaction mixture and the at least one pozzolanic accelerator comprises in the range of about 0.5 to about 10 weight percent of the reaction mixture, both based on the weight of the aqueous waste stream, and wherein the ratio of pozzolanic chemical to pozzolanic reactant is in the range of about 5:1 to about 1:1.

7. The process of claim 1 wherein the pozzolanic reactant and the pozzolanic chemicals comprise in the range of about 25 to about 40 weight percent of the reaction mixture and the at least one pozzolanic accelerator comprises in the range of about 1 to about 8 weight percent of the reaction mixture, both based on the weight of the aqueous waste stream, and wherein the ratio of pozzolanic chemical to pozzolanic reactant is in the range of about 4:1 to about 3:2.

8. The process of claim 1 wherein the retention time in step (a) is in the range of about 3 minutes to about 24 hours, the retention time in step (b) is in the range of about 0.1 minutes to about 24 hours, and the retention time in step (c) is in the range of about 0.1 minutes to about 24 hours.

9. The process of claim 1 wherein the exposed surface area to mass ratio of the solids is at least about 40 $mm^2/g$.

10. A method of treating an aqueous waste stream comprising solid waste and pathogens to render the waste stream suitable for ultimate disposal comprising:
   (a) contacting together in a reaction mixture the waste stream, an ammonia source capable of evolving ammonia for treating the waste, a pozzolanic reactant comprising $Ca(OH)_2$, pozzolanic chemicals comprising $SiO_2$ and at least one of $Fe_2O^3$ and $Al_2O_3$, and at least one pozzolanic accelerator selected from the group consisting of anionic metal silicates, anionic carbon compounds, anionic boron compounds, anionic phosphorous compounds, and gelling enhancers, in a manner suitable to cause pozzolanic stabilization reactions to occur thereby increasing the solids percentage of the reaction mixture;
   (b) allowing the reaction mixture of step (a) to reach a temperature of at least about 100° F., to reach a pH of at least about 11.5 and to evolve ammonia gas, thereby forming a heated mixture;
   (c) increasing the exposed surface area to mass ratio of the solids in the heated mixture to at least about 40 $mm_2/g$ in a manner suitable to release the evolved ammonia gas, thereby neutralizing a substantial portion of the pathogens present in the waste stream and forming a treated waste stream.

11. The process of claim 10 wherein the pozzolanic reactant and the pozzolanic chemicals comprise in the range of about 25 to about 40 weight percent of the reaction mixture and the at least one pozzolanic accelerator comprises in the range of about 1 to about 8 weight percent of the reaction mixture, both based on the weight of the aqueous waste stream, and wherein the ratio of pozzolanic chemicals to pozzolanic reactant is in the range of about 4:1 to about 3:2.

12. The process of claim 10 wherein the retention time in step (a) is in the range of about 5 minutes to about 60 minutes hours, the retention time in step (b) is in the range of about 0.5 minutes to about 120 minutes hours, and the retention time in step (c) is in the range of about 0.5 minutes to about 120 minutes.

13. The process of claim 10 wherein the exposed surface area to mass ratio of the solids is increased to the range of about 60 to about 500 $mm^2/g$.

14. The process of claim 10 wherein in step (b) the temperature reaches at least about 110° F.

15. The process of claim 10 wherein the pozzolanic accelerator is selected from anionic metal silicates.

16. A method of treating an aqueous waste stream comprising solid waste and pathogens to render the waste stream suitable for ultimate disposal comprising:
   (a) contacting together in a reaction mixture the waste stream, an ammonia source capable of evolving ammonia for treating the waste, a pozzolanic reactant comprising $Ca(OH)_2$, pozzolanic chemicals comprising $SiO_2$ and at least one of $Fe_2O_3$ and $Al_2O_3$, and a pozzolanic accelerator comprising an anionic metal silicate, in a manner suitable to cause pozzolanic stabilization reactions to occur thereby increasing the solids percentage of the reaction mixture;
   (b) allowing the reaction mixture of step (a) to reach a temperature of at least about 100° F., to reach a pH of at least about 11.5 and to evolve ammonia gas, thereby forming a heated mixture;
   (c) increasing the exposed surface area to mass ratio of the solids in the heated mixture to at least about 40 $mm^2/g$ in a manner suitable to release the evolved ammonia gas, thereby neutralizing a substantial portion of the pathogens present in the waste stream and forming a treated waste stream.

17. The process of claim 16 wherein the retention time in step (a) is in the range of about 10 minutes to about 30 minutes hours, the retention time in step (b) is in the range of about 1 minute to about 60 minutes hours, and the retention time in step (c) is in the range of about 1 minute to about 60 minutes.

18. The process of claim 16 wherein the exposed surface area to mass ratio of the solids is increased to the range of about 80 to about 200 $mm^2/g$. -

19. The process of claim 10 wherein in step (b) the temperature reaches at least about 120° F.

* * * * *